United States Patent Office 3,093,646
Patented June 11, 1963

3,093,646
ACETYLENIC DIAMIDES
Lee A. Miller, Dayton, Ohio, assignor to Monsanto Chemical Company, St. Louis, Mo., a corporation of Delaware
No Drawing. Filed Dec. 22, 1960, Ser. No. 77,487
8 Claims. (Cl. 260—268)

The present invention relates to acetylenic compounds and more particularly provides a new and valuable class of acetylenic diamides and the method of preparing the same.

According to the invention there are provided bispropiolamides by the reaction of propiolyl chloride with a nitrogen compound selected from the class consisting of hydrocarbylene diamines of the formula $$\overset{Z}{\underset{|}{HN}}-R-\overset{Z}{\underset{|}{NH}}$$

wherein R is a hydrocarbylene radical, free of aliphatic unsaturation, containing from 2 to 12 carbon atoms and being attached through diverse carbon atoms thereof to the rest of the molecule of which it forms a part, and Z is selected from the class consisting of hydrogen and alkyl radicals of from 1 to 5 carbon atoms and cyclic diimines of the formula

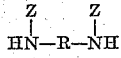

wherein D and D' are bivalent alkylene radicals having from 1 to 3 carbon atoms in the alkylene chain and a total of from 1 to 7 carbon atoms and D and D' together with the nitrogen atoms to which they are attached complete a ring of from 5 to 6 members.

Reaction of propiolyl chloride with the hydrocarbylene diamines or the cyclic diimines proceeds by a condensation reaction involving evolution of hydrogen chloride as by-product and introduction of the propiolyl HC≡C.CO— radical at each amine nitrogen, thus:

$$\overset{Z}{\underset{|}{HN}}-R-\overset{Z}{\underset{|}{NH}} + 2HC\equiv CCOCl \longrightarrow$$

$$HC\equiv C\overset{O}{\underset{||}{C}}\overset{Z}{\underset{|}{N}}-R-\overset{Z}{\underset{|}{N}}\overset{O}{\underset{||}{C}}C\equiv CH + 2HCl$$

or

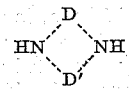

$$HC\equiv C\overset{O}{\underset{||}{C}}N\overset{D}{\underset{D'}{\diagup\hspace{-0.6em}\diagdown}}N\overset{O}{\underset{||}{C}}C\equiv CH + 2HCl$$

Thus from, e.g., p-phenylenediamine and propiolyl chloride there is obtained N,N'-p-phenylenebispropiolamide, thus:

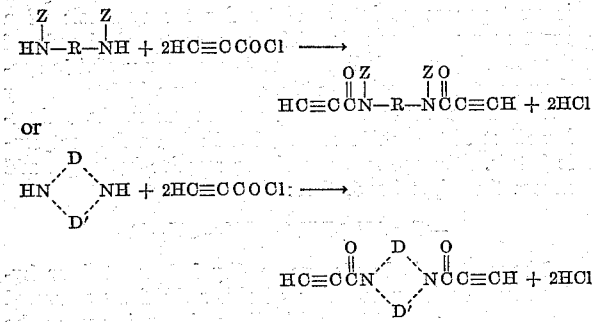

From a cyclic diimine such as piperazine, reaction with propiolyl chloride gives N,N'-dipropiolylpiperazine:

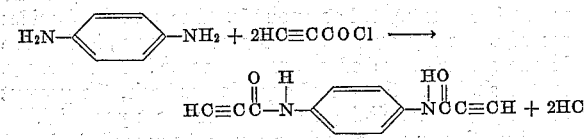

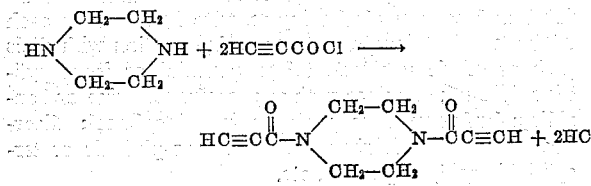

The presently useful hydrocarbylene diamines are alkylene diamines, cycloalkylene diamines, and arylene diamines. The alkylene chain or the cycloalkylene or arylene ring may or may not be substituted with one or more alkyl radicals so long as the total carbon content of the diamine does not exceed 12 carbon atoms. The diamides obtained from the hydrocarbylene diamines and propiolyl chloride are herein generically referred to as N,N'-hydrocarbylenebispropiolamides.

Examples of N,N'-alkylenebispropiolamides provided by the present invention by reaction of propiolyl chloride with an alkylenediamine are:

N,N'-ethylenebispropiolamide from ethylenediamine;
N,N'-methylethylenebispropiolamide from 1,2-propanediamine;
N,N'-1,3-propylenebispropiolamide from 1,3-propanediamine;
N,N'-1,3-propylenebis[N - methylpropiolamide] from N,N'-dimethyl-1,3-propanediamine;
N,N'-3-methyl-1,3-propylenebispropiolamide from 1,3-butanediamine;
N,N'-ethylenebis[N-propylpropiolamide] from N,N'-dipropylethylenediamine;
N,N'-4-methyl - 1,4 - tetramethylenebis[N-ethylpropiolamide] from N,N'-diethyl-1,4-pentanediamine;
N,N'-1,5-pentamethylenebispropiolamide from 1,5-pentanediamine;
N,N'-1,6-hexamethylenebispropiolamide from 1,6-hexanediamine;
N,N'-1,6-hexamethylenebis[N-ethylpropiolamide] from N,N'-diethyl-1,6-hexanediamine;
N,N'-3-methyl-1,6-hexamethylenebispropiolamide from 3-methyl-1,6-hexanediamine;
N,N'-1,7-heptamethylenebispropiolamide from 1,7-heptanediamine;
N,N' - 1,8 - octamethylenebispropiolamide from 1,8-octanediamine;
N,N'-3-pentyl-1,3-propylenebispropiolamide from 1,3-octanediamine;
N,N'-1,10-decamethylenebispropiolamide from 1,10-decanediamine;
N,N'-1,10-dimethyl-1,10-decamethylenebispropiolamide from 2,11-dodecanediamine;
N,N'-1,12-dodecamethylenebispropiolamide from 1,12-dodecanediamine, etc.

Examples of presently useful cycloalkylene diamines and the bispropiolamides obtained therefrom by reaction with propiolyl chloride are the 1,2-, 1,3- and 1,4-cyclohexanediamines which respectively yield the N,N'-1,2-cyclohexylenebispropiolamide, the N,N'-1,3-cyclohexylenebispropiolamide or the N,N'-1,4-cyclohexylenebispropiolamide;
N,N'-dimethyl-1,2-cyclohexanediamine which yields N,N'-1,2-cyclohexylenebis[N-methylpropiolamide];
1,3-cyclopentanediamine which yields N,N'-1,3-cyclopentylenebispropiolamide;
[Bicyclohexyl]-4,4'-diamine which yields N,N'-4,4'-[bicyclohexylene]bispropiolamide;
2,5-dipropyl-1,4-cyclohexanediamine which yields N,N'-2,5-dipropyl-1,4-cyclohexylenebispropiolamide, etc.

Examples of presently useful arylene diamines and the bispropiolamides derived therefrom by reaction with propiolyl chloride are o-, m- or p-phenylenediamine which yield, respectively, N,N'-o-phenylenebispropiolamide, N,N'-m-phenylenebispropiolamide, or N,N'-p-phenylenebispropiolamide;
2-butyl-p-phenylenediamine which yields N,N'-2-butyl-p-phenylenebispropiolamide;
2,2'- 2,4'-, 3,3'-, 3,4'- or 4,4'-biphenyldiamine which yield the N,N'-biphenylenebispropiolamides wherein the two propiolamide radicals are present at the positions which had been occupied by the two amine radicals of the biphenyldiamine;

The 1,2-, 1,4-, 1,5-, 1,6-, 1,7-, 1,8-, 2,6- or 2,7-naphthalenediamines which yield N,N'-naphthylenebispropiolamides wherein likewise the two propiolamide radicals are present at the positions which had been occupied by the two amine radicals of the naphthalenediamine;

N,N'-dialkylphenylenediamines such as N,N'-dihexyl-m-phenylenediamine which yields N,N'-m-phenylenebis-[N-hexylpropiolamide];

The N,N'-dimethylnaphthalenediamines such as N,N'-dimethyl-1,2-naphthalenediamine which yields N,N'-1,2-naphthylenebis[N-methylpropiolamide], etc.

The present useful cyclic diamines are, e.g., the 5-membered imidazolidines

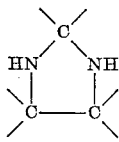

or the 6-membered piperazines

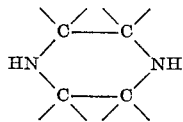

or the 6-membered hexahydropyrimidines

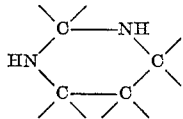

in which the dangling valences are satisfied by hydrogen or one or more alkyl radicals of such carbon chain length and in such quantity that the total number of carbon atoms in the alkylene radicals which are interposed between the two imine groups is from 1 to 7.

Examples of the presently provided heterocyclic bispropiolamides and the cyclic diimines from which they are prepared by reaction with propiolyl chloride are:

1,4-dipropiolylpiperazine from piperazine;
2,2-dimethyl-1,4-dipropiolylpiperazine from 2,2-dimethylpiperazine;
2,5-diethyl-1,4-dipropiolylpiperazine from 2,5-diethylpiperazine;
2-pentyl-1,4-dipropiolylpiperazine from 2-pentylpiperazine;
1,3-dipropiolylimidazolidine from imidazolidine;
2,4,5-triethyl-1,3-dipropiolylimidazolidine from 2,4,5-triethylimidazolidine;
1,3-dipropiolyl-2,5-dibutylhexahydropyrimidine from 2,5-dibutylhexahydropyrimidine, etc.

Reaction of the propiolyl chloride with the hydrocarbylene diamine or the cyclic diimine to give the presently provided bispropiolamides proceeds readily in the presence or absence of catalysts and/or diluents or solvents. Since the reaction is accompanied by the evolution of hydrogen halide as by-product, it is advantageous to provide for removal of the hydrogen halide from the reaction zone. This can be done by dephlegmation and venting; with rapid stirring; or by operating in the presence of a basic material as hydrogen halide scavenger, e.g., the alkali and alkali metal oxides or hydroxides or basically reacting salts thereof such as sodium, potassium, lithium, rubidium, cesium, calcium or magnesium hydroxide, carbonate or acetate.

Reaction of the propiolyl halide with the diamines or diimines to give the bispropiolamides takes place at ordinary, decreased or increased temperatures, say, at temperatures of from about −10° C. to 120° C., depending upon the nature of the amine or imine. Generally, the reaction is exothermic. Hence, it is recommended that initial runs be started at low temperatures, e.g., at around −5° C. to 10° C., and that external heating be employed only if there is no evidence of reaction at the low or ordinary room temperatures.

A solvent or diluent, though not necessary, is also recommended. This is because in the exothermic reactions it serves to dissipate heat of reaction and because, irrespective of the temperature conditions, use of the solvent or diluent minimizes a tendency of the hydrogen chloride by-product to react with the triple bond of the propiolyl chloride starting material and of the propiolate product. In this connection, it is often advantageous to select the solvent or diluent on the basis of being least compatible with, or having the poorest solvency for, hydrogen halide. Useful solvents for this purpose are the cycloalkanes, e.g., cyclohexane, cyclopentane or the alkyl-substituted cycloalkanes.

Hydrocarbon or halohydrocarbon are generally useful, however. For example, reaction of the propiolyl chloride with the diamine or diimine to give the present bispropiolamides may be effected in benzene, toluene, xylene, hexane, petroleum spirits, dichlorobenzene, ethylene dichloride, carbon tetrachloride, etc. Other presently useful diluents are the ketones and ethers, e.g., acetone, 2-propanone, ethyl ether, isopropyl ether, dioxane, etc.

Since formation of the presently provided bispropiolamides proceeds by reaction of one mole of the hydrocarbylene diamine or cyclic diimine with two moles of the propiolyl chloride, these reactants are advantageously employed in such stoichiometric proportions. However, an excess of either the chloride or the diamine or diimine may be use, since any unreacted material can be readily separated from the bispropiolamide product.

The presently provided, acetylenic diamides are stable, well-characterized compounds which range from viscous liquids to crystalline solids. They are advantageously employed for a variety of industrial and agricultural purposes, e.g., as hardening agents in synthetic rubber manufacture processes; as plasticizers for vinyl polymers, as mold-release agents in the plastics industry; and as toxicant compositions in preventing or inhibiting the growth of fungi and bacteria.

The acetylenic diamides of the invention are of great interest per se as intermediates for the synthesis of a great many compounds. The two acetylenic bonds of the presently provided compounds are very useful in syntheses not only owing to the reactivity which generally accompanies unsaturation but also owing to the activating effect of the amido carbonyl radicals on the acetylenic bonds. Compounds containing reactive hydrogen add across the triple bond, thus:

$$-C\equiv CH + RH \rightarrow -CH=CH-R$$

The acetylenic bonds are readily halogenated or hydrogenated with production of either the fully saturated or olefinically unsaturated diamides, depending upon the reaction conditions. The olefinic diamides thus obtained undergo vinyl-type polymerization alone, to give homopolymers of high molecular weight or they copolymerize with other unsaturated compounds. The olefinic diamides are also readily epoxidized to give compounds for use in the manufacture of epoxy-type resins. Accordingly, to one skilled in the art of organic synthesis, the present compounds are building materials of great potential.

Of particular value are the presently provided bispropiolamides in the preparation of high molecular weight linear polymers by addition copolymerization with difunctional compounds having reactive hydrogen in each of the two functional groups, e.g., by reaction with diols such as ethylene glycol, 1,3-propanediol or isopropylidenebiphenol; diamines such as propylenediamine or benzidine; hydroxyamines such as p-aminophenol; dicarboxylic acid or dicarboxamides such as phthalic or terephthalic acid, adipamide, etc.

The invention is further illustrated by, but not limited to, the following examples:

Example 1

A solution consisting of 8.6 g. (0.97 mole) of propiolyl chloride in 50 ml. of benzene was added to a rapidly stirred mixture of 5.46 g. (0.047 mole) of 1,6-hexanediamine, 300 ml. of water, 3.9 g. (0.097 mole) of sodium hydroxide and 50 ml. of benzene. The temperature of the reaction mixture rose from 5 to 15° C. during addition of the chloride. The whole was then stirred at 5° C. for 15 minutes and then allowed to stand at room temperature for several days. The voluminous, amorphous, snow-white solid was removed by filtration and repeatedly recrystallized from boiling water to give colorless needles of N,N'-1,6-hexamethylene-bispropiolamide, M.P. 119–20° C., analyzing 65.22% carbon and 7.52% hydrogen as against 65.43% and 7.32%, the calculated values for $C_{12}H_{16}N_2O_2$.

Example 2

A solution consisting of 11.5 g. (0.13 mole) of propiolyl chloride in 100 ml. of benzene was added to a rapidly stirred mixture consisting of 11.8 g. (0.065 mole) of p-phenylenediamine dihydrochloride, 10.4 g. (0.26 mole) of sodium hydroxide, 200 ml. of water and 50 ml. of benzene and held at a temperature of 5° C. by means of an ice-salt bath. The addition was conducted under nitrogen. When all of the propiolyl chloride had been added, the reaction mixture was allowed to warm to room temperature and filtered to give a tan amorphous solid. This was stirred with two 100 ml. portions of 5% aqueous hydrogen chloride, filtered and the solids washed free of hydrogen chloride with two 100 ml. portions of water. Three repeated crystallizations from methanol gave long lemon-yellow needles of the substantially pure N,N'-p-phenylenebispropiolamide, M.P. 228° C. (with decomposition) and analyzing 67.98% carbon and 4.22% hydrogen as against 67.92% and 3.80%, the calculated values for $C_{12}H_8N_2O_2$.

Example 3

A solution consisting of 8.8 g. (0.1 mole) of propiolyl chloride in 50 ml. of benzene was added to a rapidly stirred mixture consisting of 15.8 g. (0.05 mole) of N,N'-dimethyl-p-phenylenediamine dioxalate, 12.0 g. (0.3 mole) of sodium hydroxide, 50 ml. of benzene and 200 ml. of water at a temperature of 5° C. and under a nitrogen atmosphere. During addition of the propiolyl chloride solution the temperature of the reaction mixture rose from 5 to 14° C. Stirring was continued at 5° C. for 15 minutes and the whole was subsequently allowed to stand overnight under nitrogen. The reaction mixture was filtered and the brown solid precipitate was extracted with five 100 ml. portions of boiling absolute ethanol to give as residue 9.30 g. (77.5% theoretical yield) of the substantially pure N,N'-p-phenylenebis[N-methylpropiolamide], which analyzed 68.61% carbon and 5.29% hydrogen as against 69.99% and 5.03%, the calculated values, melting point above 300° C.

Infrared analysis showed the following structures:

≡CH at 3200 cm.⁻¹

C≡C at 2095 cm.⁻¹

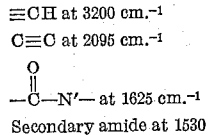

Secondary amide at 1530

Example 4

To a rapidly stirred solution consisting of 19.4 g. (0.1 mole) of piperazine hexahydrate, 8.25 g. (0.21 mole) of sodium hydroxide, 200 ml. of water and 50 ml. of benzene, there was added, with stirring, a solution of 18.2 g. (0.206 mole) of propiolyl chloride in 100 ml. of benzene. During addition of the chloride the temperature of the reaction mixture was maintained at 5° C. by means of an ice-salt bath. When all of the chloride had been added, the whole was stirred at 5° C. for 15 minutes and then allowed to stand at room temperature for several days. At the end of that time the reaction mixture was filtered to give a pale yellow solid which was insoluble in ordinary solvents. It was washed with two 500 ml. portions of boiling ethanol and dried to give the substantially pure 1,4-dipropiolylpiperazine, M.P. above 300° C.

Example 5

The 1,4-dipropiolylpiperazine of Example 4 was tested against the soil fungus Pythium. Testing was conducted by adding to soil which had been uniformly infected with the fungus a quantity of the test compound which was 0.01% the weight of the soil, thoroughly mixing the whole, incubating at 25° C. for 24 hours, seeding pots of the incubated soil with bean, cotton, cucumber and pea seeds, maintaining the seeded pots for 24 hours at 70° F. and at a high relative humidity (98%), removing the pots to the green house, maintaining them there for 2 weeks, and inspecting them for number of seedlings emerged and the condition of the shoots and roots thereof. A similar testing procedure was conducted with "controls," i.e., inoculated soil which had not been chemically treated. A very poor percent emergence and a stunted diseased condition of those of the plants which had emerged was noted in the controls, whereas excellent germination and plant growth was observed in the pots of inoculated soil which had been treated with the 1,4-dipropiolylpiperazine.

Example 6

The 1,4-dipropiolylpiperazine of Example 4 was tested against the fungi Alternaria solani, the causal organism of tomato early blight. The testing was conducted by spraying to run-off four uniform Bonny Best tomato plants at the 4–5 leaf stage with an 0.01% aqueous emulsion of the test compound, allowing the sprayed plants to dry, subsequently inoculating the tomato plants with said tomato fungus, maintaining the thus sprayed and inoculated plants in a moisture chamber at 70° F. for 36 hours, then removing them to a greenhouse bench and periodically inspecting the plants for incidence of the disease during a 5-day period. At the end of this period, the plants were observed to be flourishing and free of disease. On the other hand, controls which had been similarly inoculated and maintained were disease-ridden.

Similar testing of the 1,4-dipropiolylpiperazine against tomato leaf spot fungus showed complete inhibition of this fungus at an 0.01% concentration of the test compound.

The 1,4-dipropiolylpiperazine was also determined to give complete inhibition of apple scab fungus at the 0.01% concentration.

The presently provided bispropiolamides may be applied directly to the bacteria or fungi to be combatted, e.g., by spraying, or they may be applied to plants or other locale, in a manner so as to function either as a preventive or therapeutic agent in advance of an anticipated infection. Dust, emulsion or solution formulations may be employed for such application; furthermore, adhesive and wetting agent additives may be employed in the compositions to assist in the distribution thereof on the surfaces to be protected from the pests. The concentrations of the presently provided bispropiolamides which are employed in bacteriostat or fungistat formulations will depend on the particular bispropiolamide which is used and the specie to be attacked; a typical formulation, for example, may contain from 0.0001% to 0.1% of active ingredient, with the balance being a small quantity of a wetting agent and an inert carrier such as water, an inert organic liquid, or a dust such as talc or pumice. Effective concentrations for use under particular circumstances may be readily determined by those skilled in the art.

What I claim is:

1. A bispropiolamide selected from the class consisting of hydrocarbon bispropiolamides of the formula

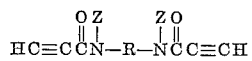

in which R is a hydrocarbon radical, free of aliphatic unsaturation, containing from 2 to 12 carbon atoms and being attached through diverse carbon atoms thereof to the rest of the molecule of which it forms a part, and Z is selected from the class consisting of hydrogen and alkyl radicals of from 1 to 5 carbon atoms, and a cyclic bispropiolamide of the formula

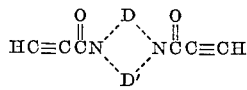

in which D and D' are bivalent alkylene radicals having from 1 to 3 carbon atoms in the alkylene chain and a total of from 1 to 7 carbon atoms and D and D' together with the nitrogen atoms to which they are attached complete a ring of from 5 to 6 members.

2. An N,N'-alkylenebispropiolamide in which the alkylene radical has from 2 to 12 carbon atoms and in which the propiolamide radicals are attached through nitrogen to diverse carbon atoms of the alkylene radical.

3. An N,N'-cycloalkylene bispropiolamide in which the cycloalkylene radical has from 6 to 12 carbon atoms and in which the propiolamide radicals are attached through nitrogen to diverse carbon atoms of the cycloalkylene radical.

4. An N,N'-arylenebispropiolamide in which the arylene radical has from 6 to 12 carbon atoms and in which the bispropiolamide radicals are attached through nitrogen to diverse carbon atoms of the arylene radical.

5. N,N'-1,6-hexamethylenebispropiolamide.
6. N,N'-p-phenylenebispropiolamide.
7. N,N'-p-phenylenebis[N-methylpropiolamide].
8. 1,4-dipropiolylpiperazine.

References Cited in the file of this patent
UNITED STATES PATENTS

| | | |
|---|---|---|
| 2,425,392 | Robinson et al. | Aug. 12, 1947 |
| 3,051,714 | Biel | Aug. 28, 1962 |